UNITED STATES PATENT OFFICE.

EMILE LANGUEPIN, OF PARIS, FRANCE.

ELECTRODE FOR ELECTRIC-ARC WELDING.

1,314,273.     Specification of Letters Patent.     Patented Aug. 26, 1919.

No Drawing.     Application filed June 29, 1918. Serial No. 242,569.

*To all whom it may concern:*

Be it known that I, EMILE LANGUEPIN, citizen of the French Republic, residing at Paris, in the Department of the Seine, France, have invented certain new and useful Improvements in Electrodes for Electric-Arc Welding, of which the following is a specification.

When it is desired to weld by the Slawianoff arc system special steels such as chrome steel, tungsten steel, vanadium steel, etc., it is necessary to use electrodes containing the above metals but it is very expensive to prepare in each case, in order to manufacture the electrodes, a steel casting containing the required amount of the desired metal.

It has already been proposed to embody the metals to be introduced into a sheath or cover placed on the surface of the electrode but the results attained by the above process are not uniform as the amount of the special auxiliary metal deposited in the welded joint varies considerably owing to the metal being carried over in the form of slag or projections.

The invention consists in joining the special auxiliary metal to the metal of the electrode by the aluminothermic process. For this purpose, a finely powdered mixture of an oxid of the metal to be added and aluminium powder is deposited onto the surface of the steel rod which will form the core of the electrode.

The amount of aluminium will be so determined that a complete reduction of the oxid will be effected, the auxiliary metal being thus liberated in the welding operation and, being in a liquid state, will be easily blended with the steel of the electrode. The metallic powder will be fixed onto the surface of the electrode by being mixed with a varnish composed of rosin and spirit so as to obtain a paste which will suitably adhere to the surface of the metal. The coating of mixture thus applied will be protected by means of any suitable fireproof composition in order to prevent oxidation of the same when the metal is heated up.

What I claim is:

1. An electrode for electric arc welding composed of a steel rod and a cover surrounding said steel rod, said cover being composed of a mixture of aluminium powder and a powdered oxid of an auxiliary metal.

2. An electrode for electric arc welding comprising a steel rod, a cover surrounding said steel rod, said cover being formed of aluminium powder, a powdered oxid of an auxiliary metal and a rosin varnish, and an outer coating of a fireproof paint.

In testimony whereof I affix my signature in presence of two witnesses.

EMILE LANGUEPIN.

Witnesses:
   LUCIEN CRESPIN,
   CHAS. P. PRESSLY.